E. A. BANSCHBACH.
STEEL WHEEL AND TIRE HOLDER.
APPLICATION FILED SEPT. 3, 1918.
1,412,034.
Patented Apr. 11, 1922.
6 SHEETS—SHEET 1.
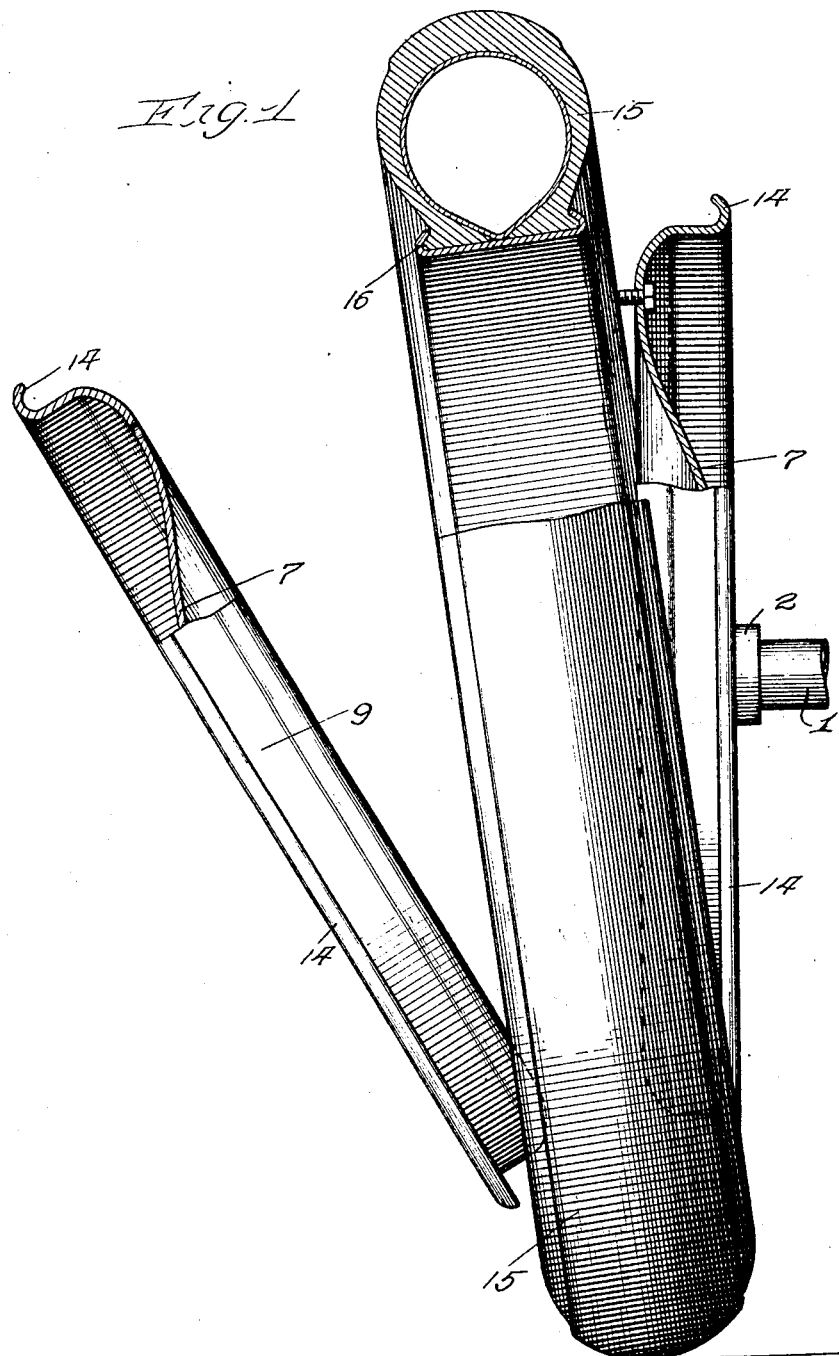

E. A. BANSCHBACH.
STEEL WHEEL AND TIRE HOLDER.
APPLICATION FILED SEPT. 3, 1918.
1,412,034.
Patented Apr. 11, 1922.
6 SHEETS—SHEET 2.
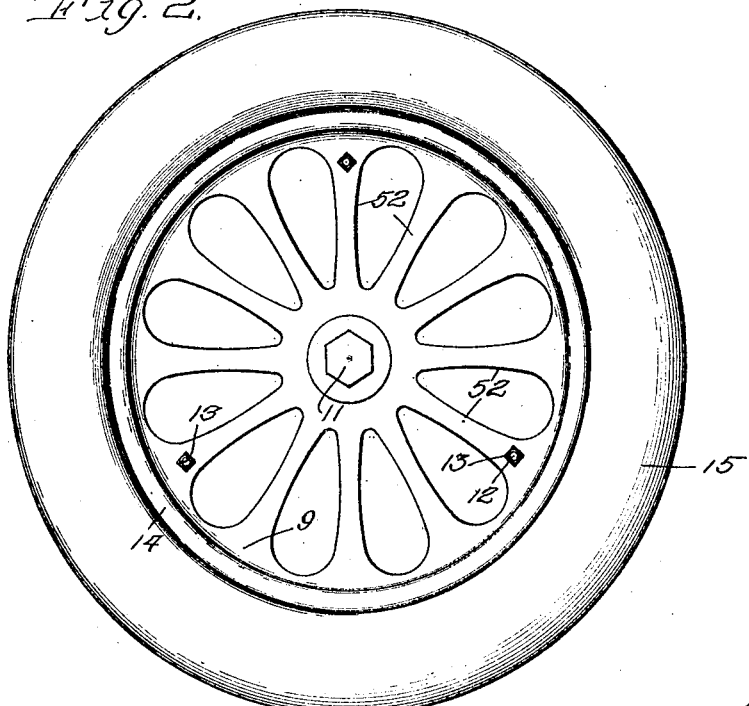
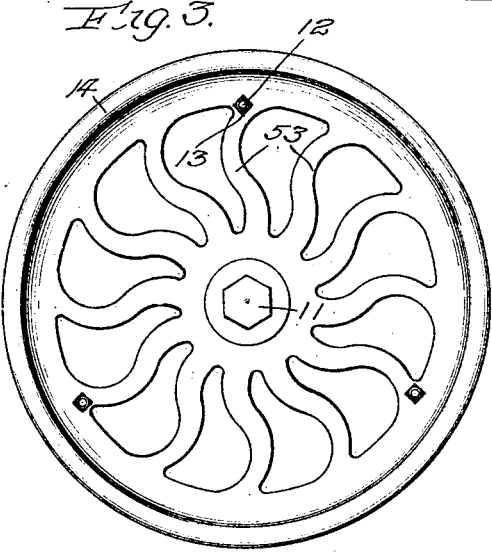
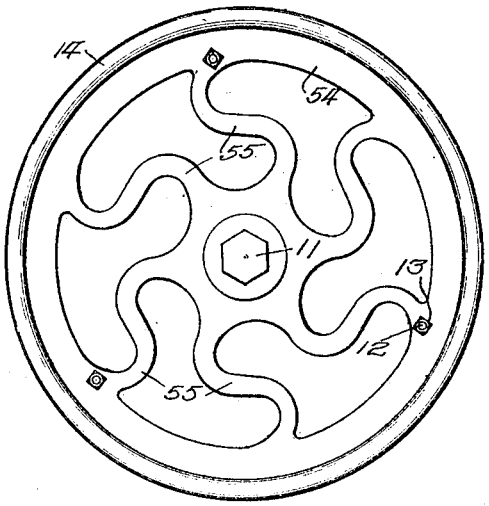
Witness:
R. L. Farrington
Inventor,
Edward A. Banschbach.
By Brown & Niesen
Attys.

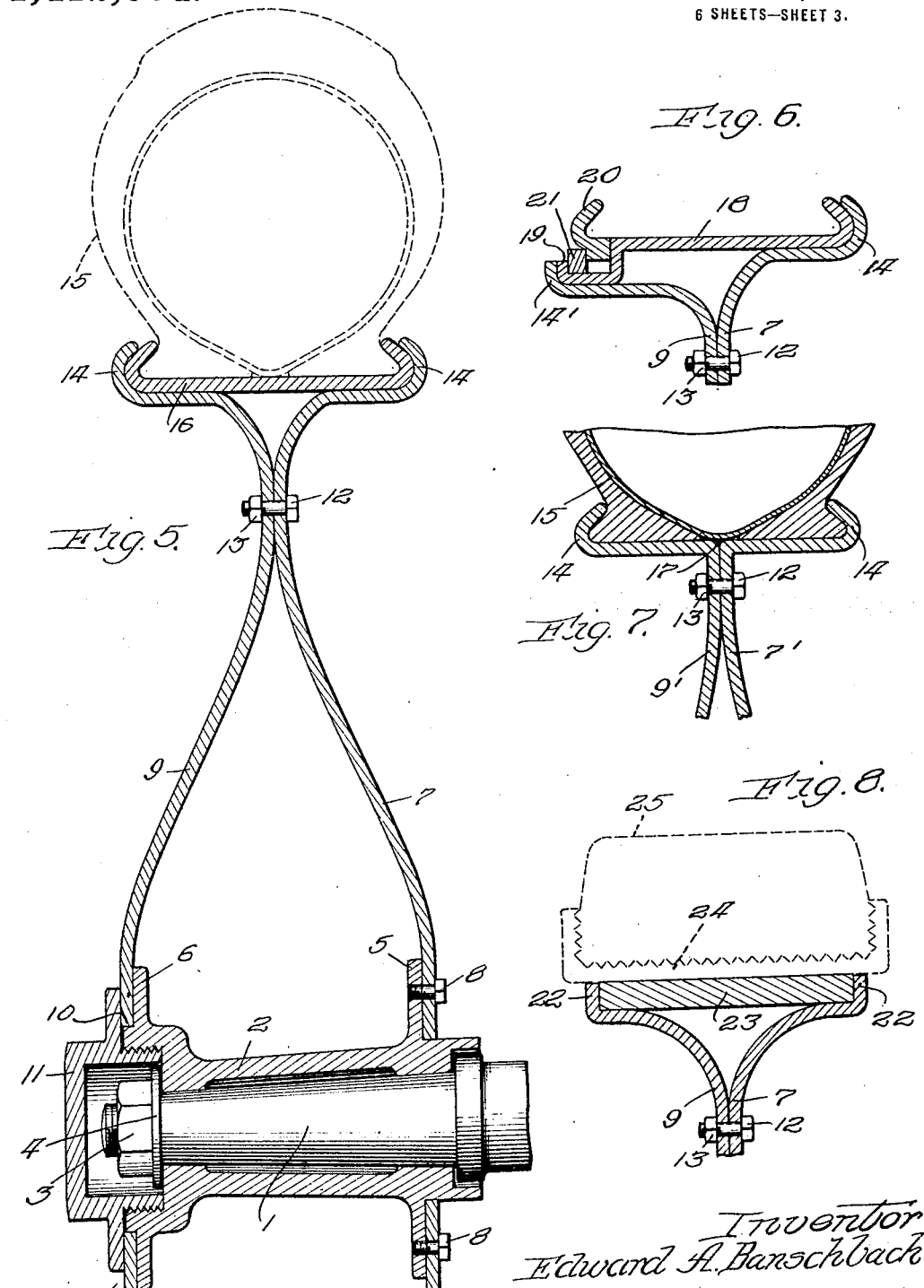

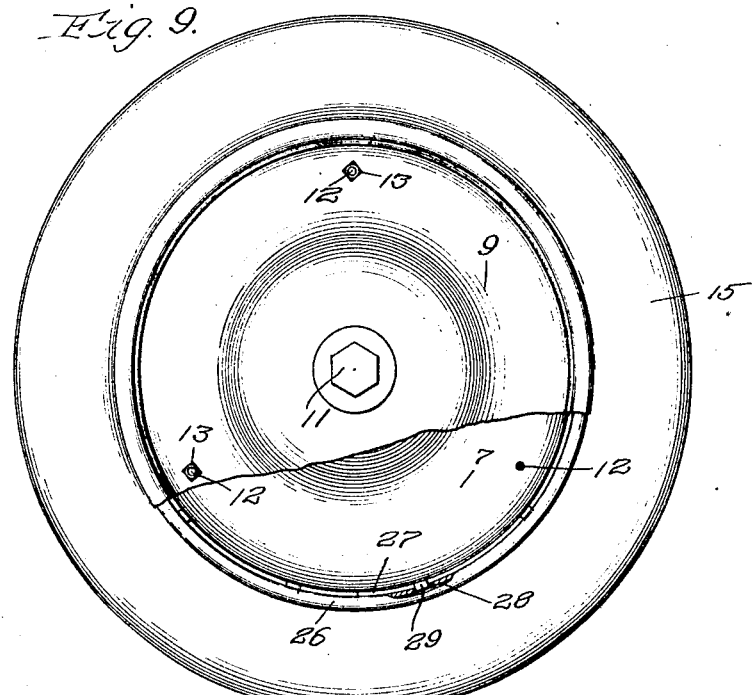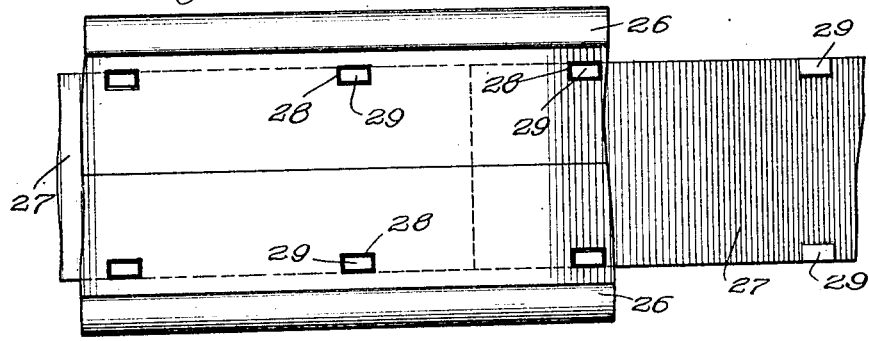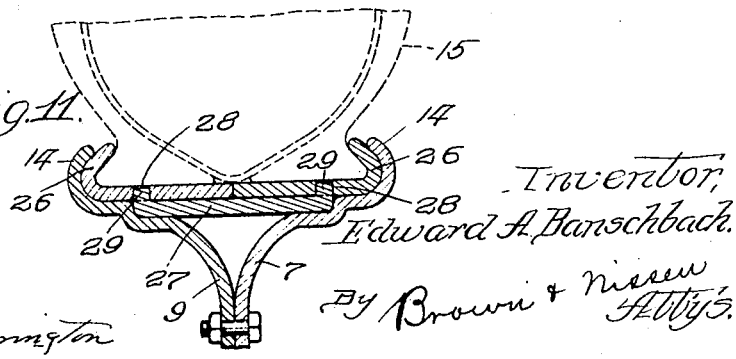

E. A. BANSCHBACH.
STEEL WHEEL AND TIRE HOLDER.
APPLICATION FILED SEPT. 3, 1918.
1,412,034.
Patented Apr. 11, 1922.
6 SHEETS—SHEET 5.
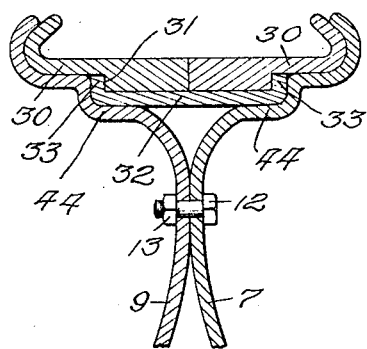
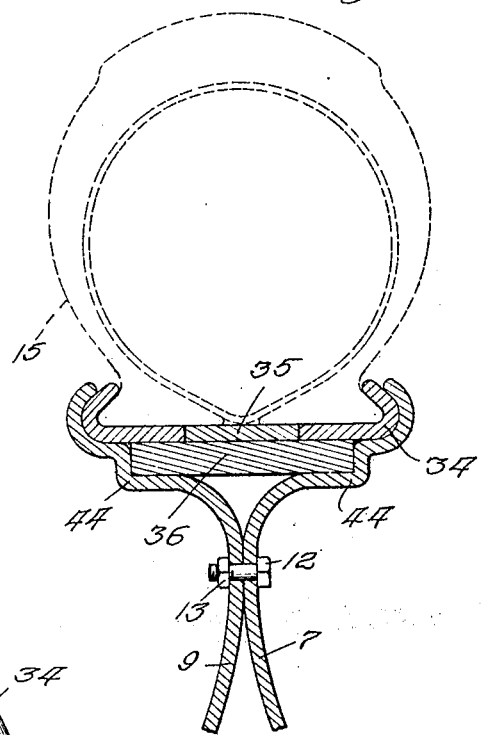
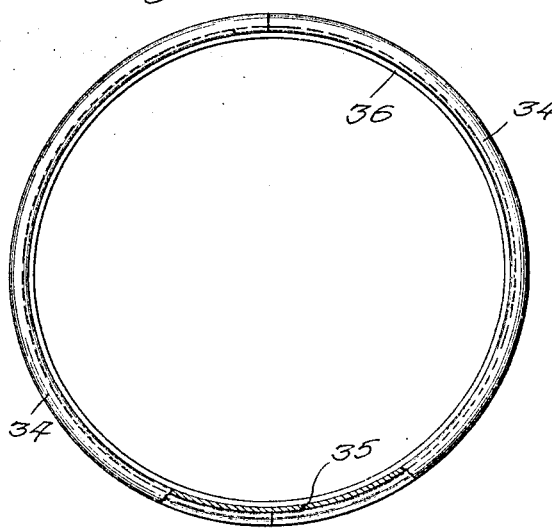
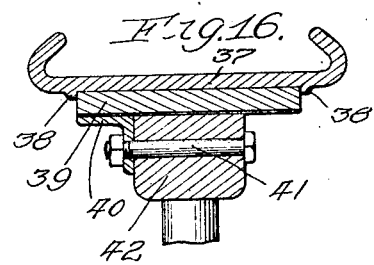
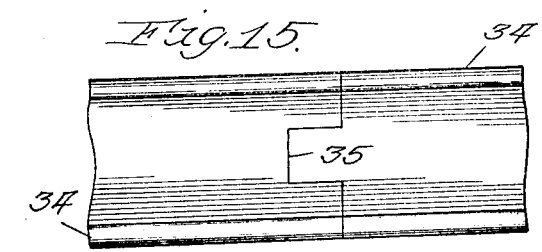
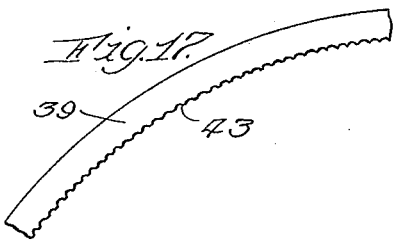
Inventor,
Edward A. Banschbach.
By Brown & Nissen
Attys.
Witness:

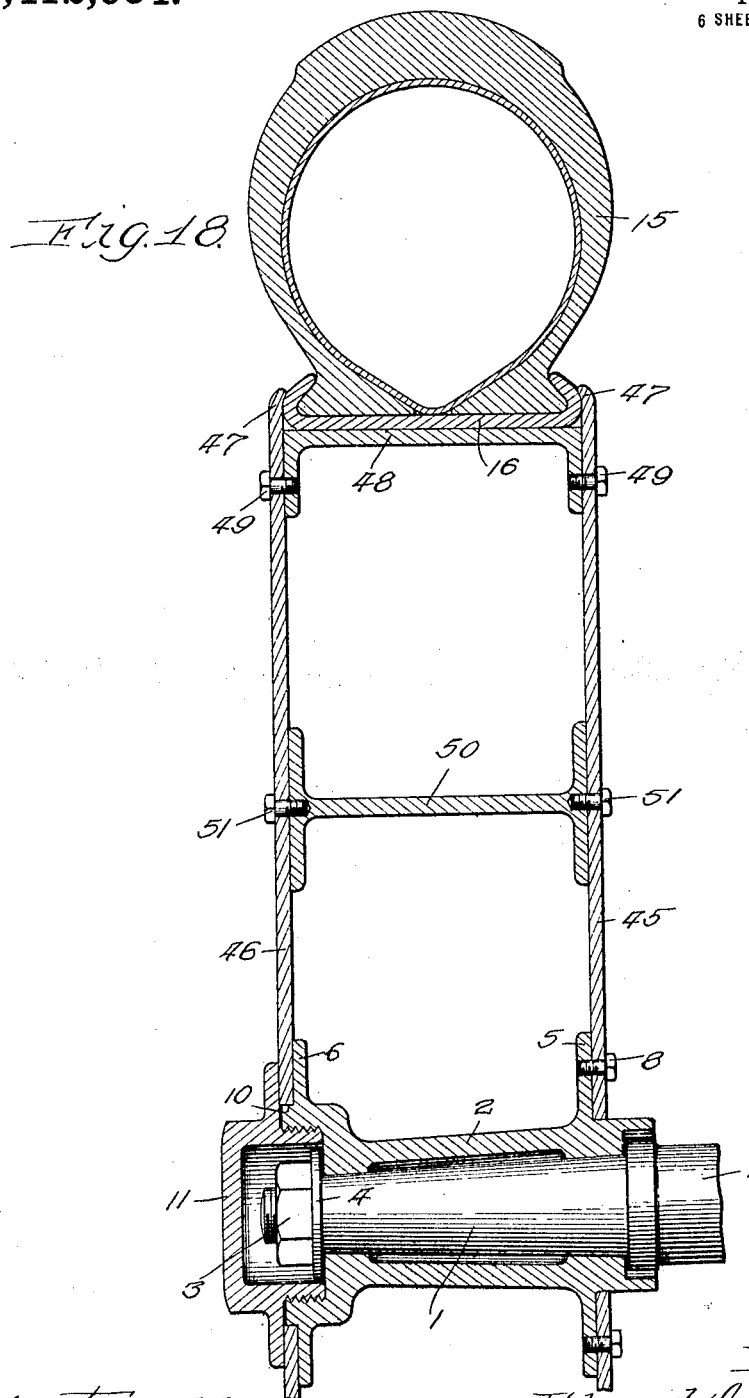

UNITED STATES PATENT OFFICE.

EDWARD A. BANSCHBACH, OF CHICAGO, ILLINOIS.

STEEL WHEEL AND TIRE HOLDER.

1,412,034.  Specification of Letters Patent.  Patented Apr. 11, 1922.

Application filed September 3, 1918. Serial No. 252,327.

*To all whom it may concern:*

Be it known that I, EDWARD A. BANSCHBACH, a citizen of the United States, residing at Chicago, in the county of Cook, State of Illinois, have invented certain new and useful Improvements in Steel Wheels and Tire Holders, of which the following is a specification.

This invention relates to a vehicle wheel but is particularly designed and intended for use in connection with automobiles and preferably pleasure cars rather than trucks or traffic vehicles, although of course it may have more general application wherever it can be used. The principal object of the invention is to provide a wheel of this class which is constructed entirely of metal and with separable parts which grip the tire or tire-holder so that by removing or disengaging one of the parts the tire or a rim and the tire can be easily removed from the wheel.

A further object of the invention is to provide improved means for holding a pneumatic tire in connection with a wheel of this kind. The invention consists in the novel construction, combination and arrangement of the parts.

In the accompanying drawings—

Fig. 1 is a view partly in section of a wheel and tire-holder constructed in accordance with the principles of this invention;

Fig. 2 is a side elevation of one form of the wheel;

Figs. 3 and 4 are modified constructions of the wheel;

Fig. 5 is a sectional view of a preferred form of the wheel;

Fig. 6 is a detail of a modified form of rim engaging construction;

Fig. 7 is a detail view showing a pneumatic tire engaged by the wheel parts without any additional holding rim;

Fig. 8 illustrates the form shown in Fig. 5 applied to a solid tire;

Fig. 9 is a side elevation of a solid disk wheel with a modified form of rim holding construction;

Figs. 10 and 11 are views illustrating a divided rim and the rim holding means shown in Fig. 9;

Fig. 12 is another modified holding means for a split rim construction;

Figs. 13, 14 and 15 show another modified form of rim construction in which the holding parts are held in position by a solid inner ring;

Fig. 16 is a sectional view showing a holding rim applied and attached to the felloe of a wooden wheel;

Fig. 17 is a detail view showing the preferred construction of the inner portion of any of the tire-holding rings to prevent the ring freezing or rusting on the wheel or holding part; and Fig. 18 is a sectional view of a rectangular strengthened wheel construction in which the rim is held in position by parallel side plates which form the wheel.

One of the principal objects of the present invention is to provide an automobile wheel which is constructed entirely of metal, and is of sectional or removable construction so that at least one of the wheel parts can be disengaged or removed from the other for loosening either the tire holding rim or the tire itself from engagement with the wheel parts so that the tire can be easily removed for replacing it with another one with no more trouble than is at present involved in the removal of a so-called demountable rim or tire.

Another function of the present construction which differs from the present practice is the provision of clamping rings or rims as a part of the wheel itself so that the engagement of these clamping rings with the rim or tire will hold the tire in place and, when the wheel parts are separated, will allow easy access to the interior of the tire casing. This is possible because of the fact that the wheel acts as a circumferentially split rim, when the tire is applied directly to the wheel and when a split rim construction is employed in connection with the wheel, as shown by Figs. 10 to 15 inclusive, the disengagement of the rim and tire casing from the wheel will permit the rim to be split longitudinally for access to the interior of the casing.

Referring now more particularly to the drawings, this wheel is applied to a tapered axle 1 by means of a hub member 2 mounted thereon and held in position in the ordinary manner by means of a nut 3 and a washer 4 at the outer end of the axle. This hub member 2 is preferably formed with inner and outer flanges 5 and 6 to the former of which an inner wheel plate 7 is preferably secured by means of bolts 8. An outer wheel plate 9 may be free from actual connection with the hub member 2, preferably resting upon a shoulder 10 formed on the hub member, the outer plate 9 being held in position by means of a cap 11 which is threaded into the hub member 2, covering and protecting the nut 3 and the end of the axle in a well known manner.

These plates 7 and 9 are preferably curved inwardly so that they may be drawn together at a point adjacent their peripheries and held tightly together by means of fastening bolts 12 and nuts 13 which extend through registering holes in the plates. The outer edges of the plates are curved outwardly forming engaging rims 14 which are bent inwardly to directly grip the casing 15 of a pneumatic tire, as shown in Fig. 7, or to grip a rim 16 in which such a tire is mounted, as shown more clearly in Figs. 1 and 5.

In case the tire 15 is gripped directly by the rim portions 14, as shown in Fig. 7, the adjacent edges of plates 7' and 9' are preferably bent at right angles so that they fit closely together at the point designated by the character 17 in this figure; but if the wheel plates 7 and 9 are simply employed to grip a holding rim, as shown in the other figures, the wheel plates need not be thus closely brought together and in fact, as shown by Fig. 6, the clamping rings 14 and 14' need not even be on the same level for in this case the tire holding rim comprises a member 18 with a holding rim at one side and with a reduced offset 19 in which is seated a separate rim 20 held in place in the offset by means of a holding ring 21.

In case it is desired to support a solid tire, as shown in Fig. 8, the wheel plates 7 and 9 may be formed with straight parallel projections or rims 22 in which is seated a ring 23 which is attached as by hydraulic pressure, or any other suitable holding means, to a tire rim 24 in which a tire 25 is contained.

In the form shown by Figs. 9, 10 and 11 a casing 15 is held in place by a circumferentially or longitudinally split rim having two similar clamping rings 26 to engage the edges of the tire which are held in place by a transversely split rim 27 which is placed inside of the rim sections 26 and is held in engagement with them by means of perforations 28 in the rim sections and corresponding projections 29 of the holding ring. The holding ring is sprung in position engaging the rims 26 and the tire can then be inflated and carried as a spare tire.

A somewhat similar holding ring is shown in Fig. 12, in which the rim sections 30 are formed on their inner side with shoulder portions 31 which is engaged by a split ring 32 having outer flanges 33 to engage the shoulder portions 31.

In the form shown by Figs. 14, 15 and 16 the clamping rim 34 is formed in segmental sections which are joined by a tongue and slot connection 35, as shown in Fig. 15, with a continuous inner holding ring 36 which is also easily removable, applicable to a tire.

It is also contemplated that a segmental rim 37, as shown in Fig. 16, may be formed with shoulders 38 on its inside surface which are engaged by a ring 39 for holding the rim sections 37 in place when applied to a tire. If desired, a construction of this kind may be provided with a number of projections or a projecting ring 40 which extends inwardly from one edge of the holding ring 39, and this ring 40 may be provided with perforations through which holding bolts 41 may be inserted for positively attaching the tire and the rim to the felloe 42 of a wooden wheel, or if desired in the same way to a steel wheel.

In all of the cases where a metal ring is applied to the wheel plates or to another holding ring it is found desirable to do away with extensive flat contacting surfaces for the reason that in practice flat surfaces are found to "freeze" together, caused by the rusting of the parts, and it is extremely hard in some cases to separate them. To overcome this the inner or contacting edge of a ring 39, as shown in Fig. 17 may be formed with a serrated or grooved edge 43 which can be easily loosened from its contact with another part by a light tap with a hammer, as there are no extensive flat surfaces in contact.

In the forms shown by Figs. 11, 12 and 13 it is necessary to provide the wheel plates 7 and 9 with a further offset or depression 44 adjacent the clamping rings thereof for seating the holding rings of the tire. This is a simple matter, however, in the formation of the wheels as the plates can be simply pressed into shape by a forming operation and the addition of one or more bends or curves at the periphery of these plates is a comparatively simple matter.

In curving the wheels inwardly adjacent their periphery a somewhat greater resilience of the wheel action is provided for, but if it is desired to overcome this to a certain extent for the use of heavier traffic vehicles the side plates may be made straight, as shown in Fig. 18, in which the inner plate 45 is secured to the hub member 2 and the outer plate 46 rests upon the shoulder 10 thereof, with clamping rims 47 extending slightly beyond an outer ring 48 upon which the tire holding rim 16 is seated, the side plates 45 and 46 being secured to the ring 48 by means of bolts 49 so that by removing the outer bolts 49 and the cap 11 at the axis the outer plates can be removed, as previously described in connection with Fig. 5. In this construction if it is desired to further strengthen the wheel an intermediate brace 50 is interposed between the axle and the periphery and is usually circular in shape. It may also be secured to both the plates by fastening devices 51.

It is also desirable to make the preferred form of wheels as light as possible without sacrificing any needed strength, and it may even be desired to give the wheels an additional resilience. Both of these conditions may be fulfilled by punching or providing the plates with perforations 52, as shown by Fig. 2. In this case the portions between the perforations resemble spokes of a wheel and the construction has more nearly the appearance of a wooden wheel. By providing the curved plates with a curved opening 53, as shown in Fig. 3, additional resilience is given to the wheel and in order to accentuate this feature openings or perforations 54, as shown by Fig. 4, may be provided which will have a curved or S-shaped partition 55 between the perforations which in the case of the steel plates may have a considerable resilient effect which is varied of course by the thickness of the plates of which the wheel is constructed and by the amount of curvature which is given to the portions 55. Any of these forms, however, give a distinctive and pleasing appearance as well as a highly satisfactory action.

It is obvious that in order to apply a new tire or to remove an old one all that it is necessary to do is to remove the outer plate of the wheel by removing the hub cap 11 and the fastening devices which hold the wheel plates together. The outer plate can then be bodily removed, as illustrated in Fig. 1, and the tire and the holding rim can be easily removed, as shown in Fig. 1, or if the tire is applied and held directly by the wheel parts, as shown in Fig. 7, the removal of the outer wheel plate will of itself allow free access to the interior of the casing for removing or repairing the inner tube.

It is obvious that a wheel of this construction can be easily and quickly made, that it will be light and strong in construction and will be comparatively inexpensive and pleasing in appearance, so that all the desirable qualities of a good wheel are combined.

I claim:

A vehicle wheel comprising a hub; a tire rim substantially concentric with the hub and having longitudinally extending spaced shoulders at its inner side; a ring on the inner side of said tire rim having parts engaging said shoulders; and two discs attached at their central parts of said hub and having peripheral parts disposed against portions of the inner sides of both the tire rim and said ring and other peripheral portions clamping the lateral edges of both the tire rim and said ring.

In testimony whereof I have signed my name to this specification on this 31st day of August, A. D. 1918.

EDWARD A. BANSCHBACH.